(12) United States Patent
Tsubono (10) Patent No.: US 7,281,556 B2
(45) Date of Patent: Oct. 16, 2007

(54) PNEUMATIC TIRE WITH TREAD PORTION HAVING ZIGZAG SIPES

(75) Inventor: Fumihiro Tsubono, Kobe (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 89 days.

(21) Appl. No.: 10/954,176

(22) Filed: Oct. 1, 2004

(65) Prior Publication Data

US 2005/0121124 A1 Jun. 9, 2005

(30) Foreign Application Priority Data

Dec. 3, 2003 (JP) ............... 2003-404830

(51) Int. Cl.
*B60C 11/12* (2006.01)
(52) U.S. Cl. .................. 152/209.21; 152/209.23; 152/902; 152/DIG. 3
(58) Field of Classification Search ........... 152/209.18, 152/209.21, 209.23, 902, DIG. 3
See application file for complete search history.

(56) References Cited

U.S. PATENT DOCUMENTS

| | | | | |
|---|---|---|---|---|
| 4,566,514 A | * | 1/1986 | Mauk et al. | ........... 152/DIG. 3 |
| 5,350,001 A | * | 9/1994 | Beckmann et al. | .... 152/DIG. 3 |
| 5,591,280 A | * | 1/1997 | Asano | ................... 152/DIG. 3 |
| 5,783,002 A | * | 7/1998 | Lagnier | .................. 152/DIG. 3 |
| 6,026,875 A | * | 2/2000 | Diensthuber et al. | .. 152/DIG. 3 |
| 6,427,737 B1 | * | 8/2002 | Katayama | ............... 152/DIG. 3 |
| 6,907,910 B2 | * | 6/2005 | Iwamura | ................ 152/DIG. 3 |
| 2002/0170643 A1 | * | 11/2002 | Kuze | ..................... 152/209.18 |

FOREIGN PATENT DOCUMENTS

| | | |
|---|---|---|
| DE | 103 60 432 A1 | 7/2004 |
| EP | 0 952 011 A | 10/1999 |
| EP | 1 277 599 A2 | 1/2003 |
| JP | 2000 006619 A | 1/2000 |
| JP | 2002-321509 | * 11/2002 |
| JP | 2003-25812 A | 1/2003 |

\* cited by examiner

*Primary Examiner*—Steven D. Maki
(74) *Attorney, Agent, or Firm*—Birch, Stewart, Kolasch & Birch, LLP (57) ABSTRACT

It is an object of the present invention to improve the running performance on snowy and icy roads, and for this purpose, blocks provided with sipes are formed at a tread portion. The sipes include an open top end that opens at a block surface and a bottom, and a configuration of the sipes in a plane parallel with the block surface comprises a zigzag part extending in the length direction of the sipes. The zigzag part displaces upon turning back to one side and to the other side in a length direction of the sipes in the course from the open top end to the bottom. At least one block includes a first sipe and a second sipe which depths of the turn-back points of displacement from the open top end and/or positions of the turn-back points of displacement in the length direction differ from each other.

5 Claims, 10 Drawing Sheets

Shearing force

PNEUMATIC TIRE WITH TREAD PORTION HAVING ZIGZAG SIPES

This Nonprovisional application claims priority under 35 U.S.C. § 119(a) on Patent Application No(s). 2003-404830 filed in Japan on Dec. 3, 2003, the entire contents of which are hereby incorporated by reference.

BACKGROUND OF THE INVENTION

1. Field of the Invention

The present invention relates to a pneumatic tire such as a studless tire that is suitable for running on snowy and icy road surfaces.

2. Description of the Prior Art

For improving the running performance on snowy and icy road surfaces of pneumatic tires, it has been considered, in the prior art, that it is effective to partition tread portions into blocks and to provide a large number of sipes in those blocks for increasing edge effects thereof. On the other hand, accompanying an increase in the number of provided sipes, large collapsing of blocks is apt to occur as illustrated in FIG. 6(B). The applicant has thus suggested in Japanese Patent Laid-Open Publication No. 2003-25812 sipes having a configuration in a so-called Miura-Ori fold for preventing such excessive collapsing of blocks.

Such sipes have a configuration in a plane parallel with the block surface that comprises a zigzag part extending in the length direction of the sipes. Such zigzag parts displace upon being turned back to one side and to the other side in the length direction of the sipes in the course the sipes reach from an open top end that opens at the block surface to a bottom thereof. Such sipes are arranged in that mutually opposing sipe surfaces comprise three-dimensional concaves and convexes, wherein these concaves and convexes are in mesh with each other. With this arrangement, block pieces among sipes will become integral with each other so as to improve the block rigidity, and it is accordingly possible to prevent excess collapsing of the blocks.

However, it was further found that, for the purpose of further improving the rigidity of the entire block or the edge effects thereof, it is necessary to improve a plurality of sipes included in the blocks in a mutually correlated manner, in addition to improving configurations of each sipe.

The present invention has been made in view of such problems, and it is an object thereof to provide a pneumatic tire that is capable of further restricting collapsing of blocks and of further improving the running performance on snowy and icy road surfaces on the basis of an arrangement in which first sipes and second sipes of different positions of turn-back points of displacement are included in at least one block.

SUMMARY OF THE INVENTION

The invention as recited in Claim 1 of the present invention is a pneumatic tire comprising a tread portion, the tread portion having blocks provided with sipes, the sipes having an open top end that opens to a block surface and a bottom, and a configuration of the sipes in a plane parallel with the block surface comprising a zigzag part, wherein the zigzag part displaces upon turning back to one side and to the other side in a length direction of the sipes in the course from the open top end to the bottom, and wherein first sipes and second sipes which depths of the turn-back points of displacement from the open top end and/or positions of the turn-back points of displacement in the length direction differ from each other are provided on at least one of the blocks.

By restricting excess collapsing of the blocks in the pneumatic tire according to the present invention, it is possible to improve the effectiveness of the edges of the sipes and to remarkably improve the driving performance on icy surfaces. Since at least two types of sipes of different positions of turn-back points of displacement are included in a single block, it is possible to further improve the above effects also in the presence of external force in all directions.

BRIEF EXPLANATION OF THE DRAWINGS

FIG. 3(A) to 3(C) are three-sided views illustrating first sipes;

FIG. 4(A) to 4(C) are three-sided views illustrating second sipes;

DESCRIPTION OF THE PREFERRED EMBODIMENTS

Figure 1:
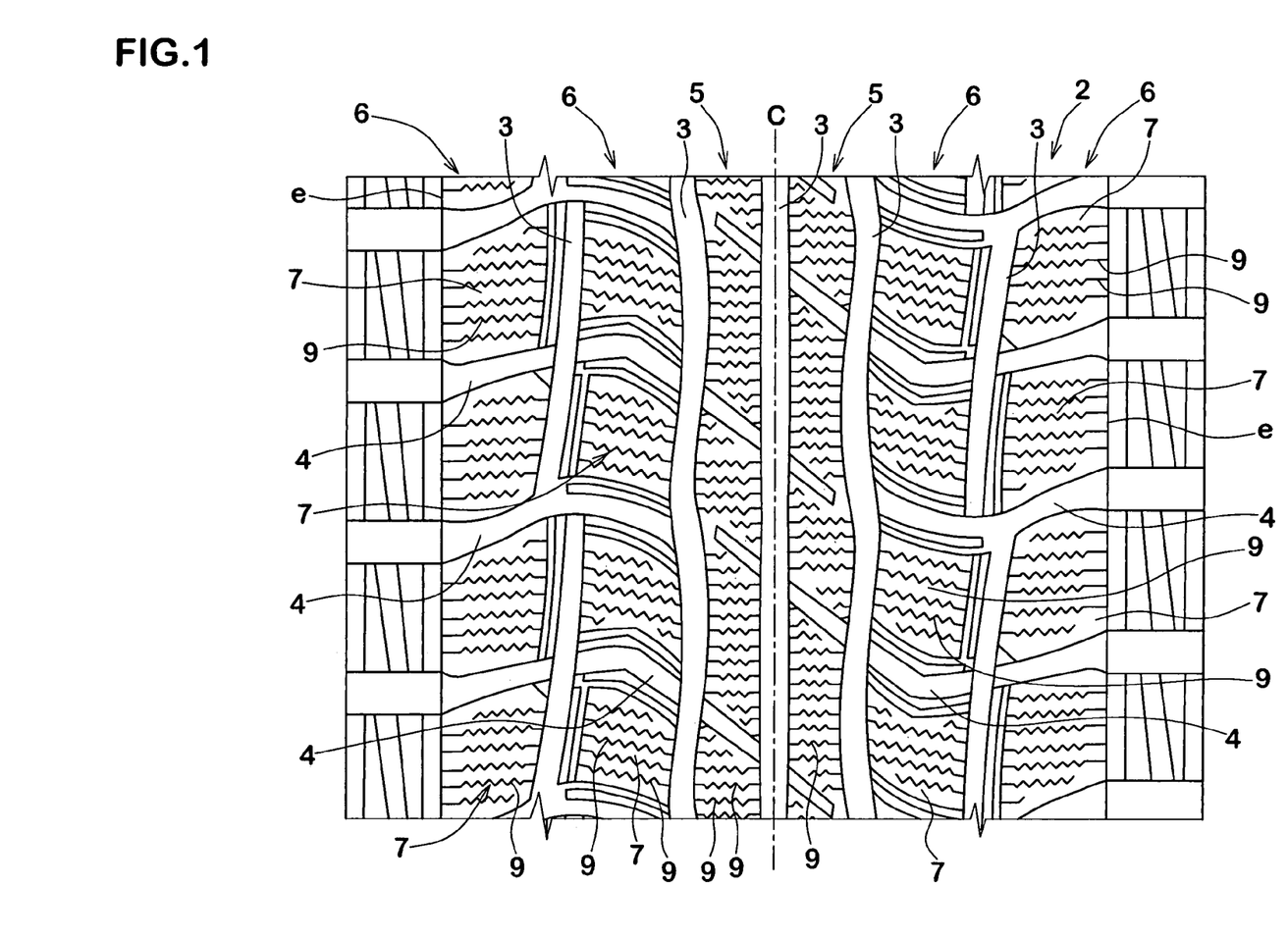
FIG. 1 is an exploded view illustrating a tread pattern of the pneumatic tire according to the present invention.

Embodiments of the present invention will now be explained on the basis of the drawings. FIG. 1 is an exploded view illustrating a tread pattern in case the pneumatic tire according to the present invention is a studless tire for use in passenger cars.

In FIG. 1 the pneumatic tire includes, at a tread portion 2 thereof, tread grooves which are comprised of a plurality of circumferential main grooves 3 extending in a circumferential direction of the tire, and lateral main grooves 4 in directions orthogonal to the circumferential main grooves 3. With this arrangement, the tread portion 2 is partitioned into two ribs 5, 5 extending on both sides of a tire equator C and, for instance, respectively two rows of blocks outside of which blocks 7 are disposed at intervals in the tire circumferential direction. It is desirable to form each of the circumferential main grooves 3 and the lateral main grooves 4 to have a groove width of not less than 3.5 mm for improving the drainage performance.

Figure 2:
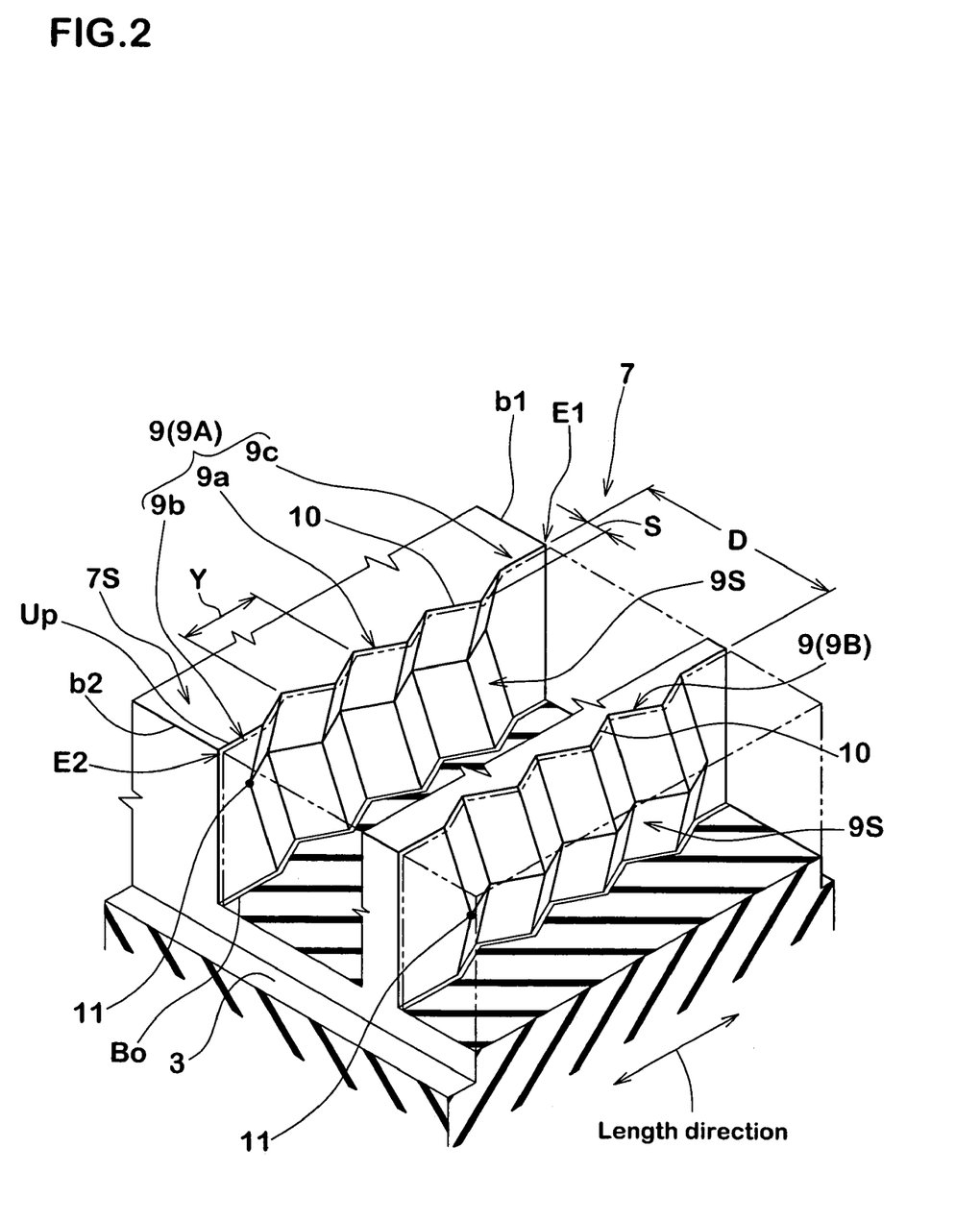
FIG. 2 is a partial perspective view of a block.

In the present embodiment, the ribs 5 and blocks 7 are provided with sipes 9 that are disposed at intervals in the tire circumferential direction. The sipes 9 extend in an axial direction of the tire, and by setting their angles with respect to the tire axial direction to be not more than 30° and preferably not more than 20°, lateral components of edges of sipes 9 will work effectively for improving driving force and braking force on icy road surfaces. In the present embodiment, a great part of the sipes 9 adjoining each other in the tire circumferential direction appears in a substantially parallel manner on the surface of the ribs 5 or the blocks 7. In this context, parallel means that virtual straight lines connecting each ends of the sipes 9 are substantially parallel. While interval pitches D for the sipes 9 (as illustrated in FIG. 2) are not particularly limited, when such pitches are too small, the rigidity of the blocks 7 tends to be degraded so that chipping of rubber or similar are apt to occur. On the other hand, when they are too large, there will be tendency of degradations in driving performance on snowy and icy roads. Accordingly, the interval pitches D are preferably in the range of 2.0 to 10.0 mm, and further in the range of 3.0 to 5.0 mm.

The sipes 9 are arranged in that their groove widths comprise small notches, and the groove widths-can be easily closed through action of external force during running (shearing force etc.). They can accordingly be distinctively distinguished from the circumferential main grooves 3 or the lateral main grooves 4 that contribute to the drainage performance. While the groove width for the sipes 9 is not particularly limited, when it is too large, there will be tendency of excess degradation in the rigidity of the blocks 7 while when it is too small, processing will become difficult so that the productivity tends to be worsened. In view of those aspects, it is desirable to set the groove width for the sipes 9 to not more than 2 mm, preferably not more than 1.5 mm, more preferably in the range of 0.5 to 1.0 mm. In this respect, the sipes 9 of the present embodiment are recessed at the time of vulcanization through knife blades provided at vulcanization molds.

FIG. 2 illustrates a perspective view in which one block 7 is partially enlarged and in which one part thereof is cut away. In this example, first sipes 9A and second sipes 9B adjoining each other in the tire circumferential direction are illustrated as the sipes 9. In some cases, these will be generally referred to as "sipes 9". The first sipes 9A include open top end Up that open at a block surface 7S and the configuration of the sipes 10 at the open top end Up is such that it has a length extending from one end Ei on one side edge b1 side of the block 7 to the other end E2 on the other side edge b2 side thereof, and a zigzag part 9a is formed therebetween in the length direction. While the sipes 9 of the present example are of so-called both end open type in which both of the one end E1 and the other end E2 continue into the circumferential main grooves 3 or tread ends e, they may alternatively be of one-side open type in which either one of the ends E1 or E2 are opened and also be of closed type in which both ends E1, E2 are closed.

Further, the present example illustrates a case in which the sipe configuration 10 is comprised of the zigzag part 9a extending in the length direction and of straight linear parts 9c, 9b that extend from both ends thereof to the one end E1 and the other end E2. However, the presence of the straight linear parts 9b, 9c is arbitrary, and it is alternatively possible to employ a form in which the straight linear part 9b or 9c is provided at only one of the zigzag part 9a or a form in which it is comprised of the zigzag part 9a alone while the straight linear parts 9b, 9c are omitted.

As for the zigzag configuration of the zigzag part 9a, it is possible to employ, for instance, wave-like or sinusoidal wave-like curved shapes in which arc-like curves are repeated or alternatively polygonal-line shapes in which straight linear elements such as V-shapes are repeated. It is also possible to employ a mixture of two or more types thereof. However, in view of block rigidity and in view of securing a large flexural rigidity of the knife blades for forming the sipes, a polygonal-line shape as that of the present example is preferable. At this time, corners of the turnoff are preferably formed to be of small arcs. A preferred form for the zigzag part 9a is such that an amplitude S of the zigzag is set to 0.7 to 10.0 mm and more preferably to 0.7 to 2.0 mm, and a zigzag pitch Y in the length direction is preferably set to 0.6 to 10.0 times the amplitude S and further to 0.6 to 2.5 times thereof.

Figure 3A:
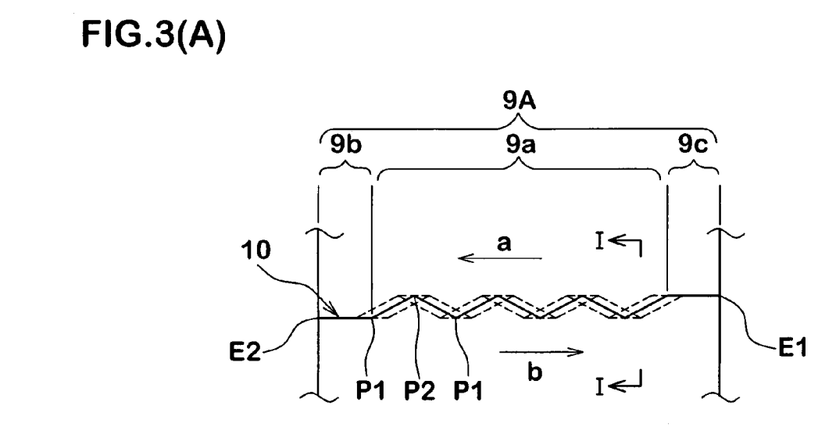
Figure 3B:
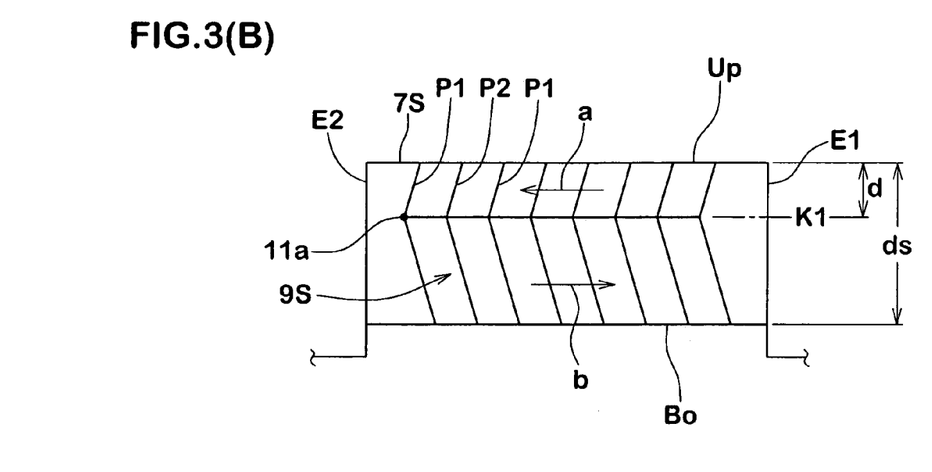
Figure 3C:
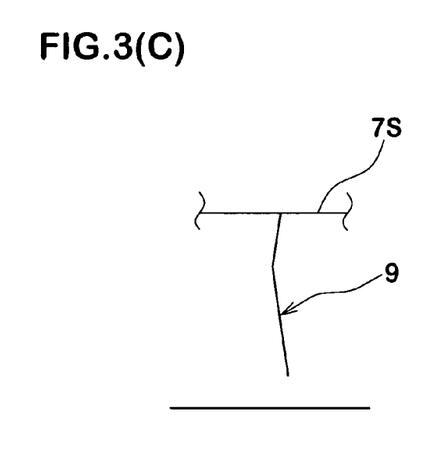

FIG. 3 illustrates a three-sided view of the first sipes 9, wherein (A) is a plan view, (B) a front view along sipe surface 9S, and (C) a sectional view seen from side portion I-I. In the first sipes 9A, the zigzag part 9a displaces upon turning back to one side and to the other side in a length direction of the sipes in the course from the open top end Up to a bottom Bo of the sipes 9. At this time, the zigzag configurations of each zigzag portion 9a are identical in surfaces that are parallel to the block surface 7S. In this respect, reference numeral 11a denotes the turn-back points of displacement.

As it is more particularly apparent from ridge lines P1, P2 of the peaks and troughs of the zigzag part 9a, the first sipes 9A are arranged in that the zigzag part 9a displaces to the other end E2 side as indicated by arrow a accompanying an increase in the depth from the block surface 7S (or the open top end Up of the sipes). Then, at a depth position K1 in which the depth d from the block surface 7S is approximately 33% of the sipe depth ds, the direction of displacement is turned back towards the one end E1 side as indicated by the arrow b. In this manner, the turn-back point 11a of displacement is included at one spot in the present embodiment. In this manner, the first sipes 9A are arranged in that the lengths of straight linear parts 9b, 9c on both sides change without changing the length of the zigzag parts 9a.

The first sipes 9A are arranged in that their amount of displacements per each unit depth (hereinafter also simply referred to as "displacement amount") is constant. More particularly, the ridge lines P1, P2 substantially form a straight line in a front view, and the ridge lines P1, P2 further appear to be substantially parallel from the block surface 7S to the sipe bottom Bo. This serves to reduce bent parts of the knife blades to minimum for improving the durability and workability of the knife blades.

The turn-back points 11a of displacement are defined by the depth d from the block surface 7S and the position in the length direction. The position of the turn-back points of displacement 11a in the length direction is defined upon focusing on one of the end positions of the zigzag parts 9a in the tire axial direction at the open top end Up. In FIG. 3(B), the left end position of the zigzag parts 9a is defined as a reference position.

Figure 4A:
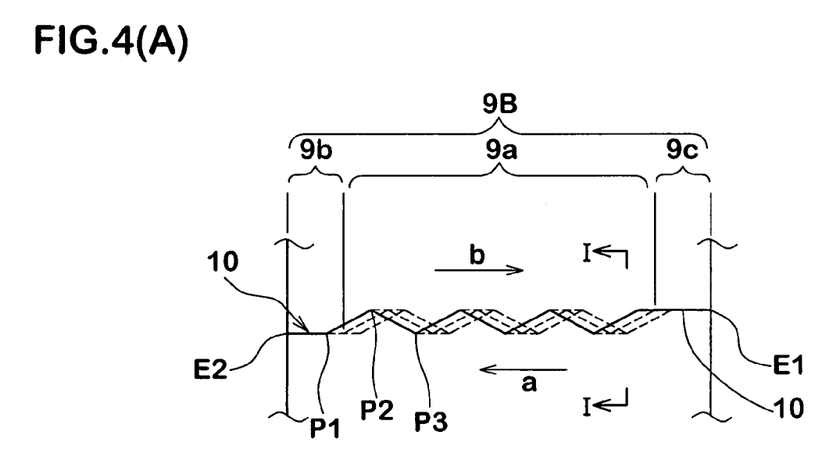
Figure 4B:
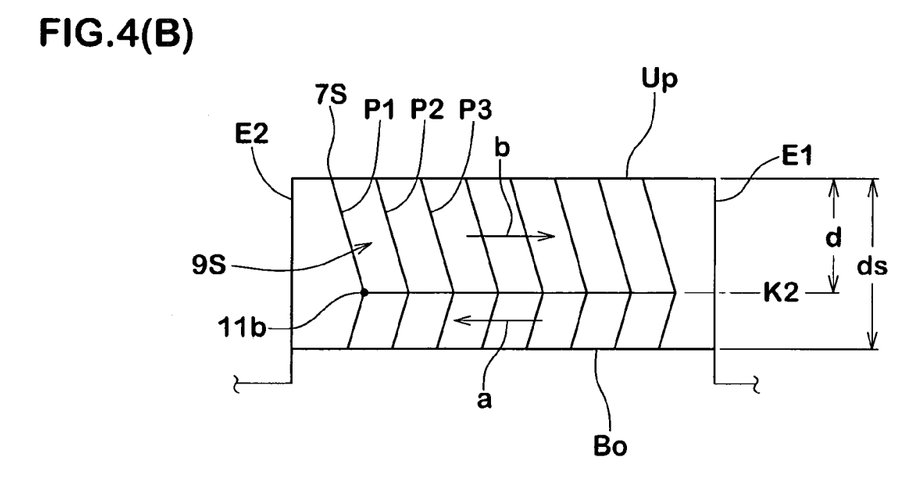
Figure 4C:
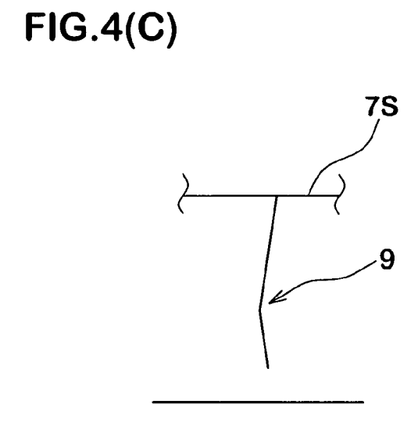

FIG. 4 illustrates a three-sided view of the second sipes 9B. In the second sipes 9B, the zigzag part 9a similarly displaces upon turning back to one side and to the other side in a length direction of the sipes in the course from the open top end Up to the bottom Bo. More particularly, in the second sipes 9B, the zigzag part 9a displaces towards the one end E1 side as indicated by the arrow b accompanying an increase in the depth d from the block surface 7S. Then, at a depth position K2 in which the depth d from the block surface 7S is approximately 66% of the sipe depth ds, the direction of displacement is turned back towards the one other end E2 side as indicated by the arrow a. In this manner, the second sipes 9 similarly include turn-back points 11a of displacement at one spot. However, the turn-back points of displacement 11 may also be provided at two or more spots in the depth direction. The respective ridge lines P1, P2 of the sipe surfaces 9S will appear to be parallel to each other from the block surface 7S to the sipe bottom Bo.

The sipe surfaces 9S of the first and second sipes 9A, 9B are illustrated in the present example as those in which the zigzag parts 9a are combinations of planes that are substantially parallelograms. In the first and second sipes 9A, 9B, the zigzag configurations of the zigzag part 9a are identical to each other, and sipe configurations 10 at the open top end Up are similarly of identical shapes.

Figure 5:
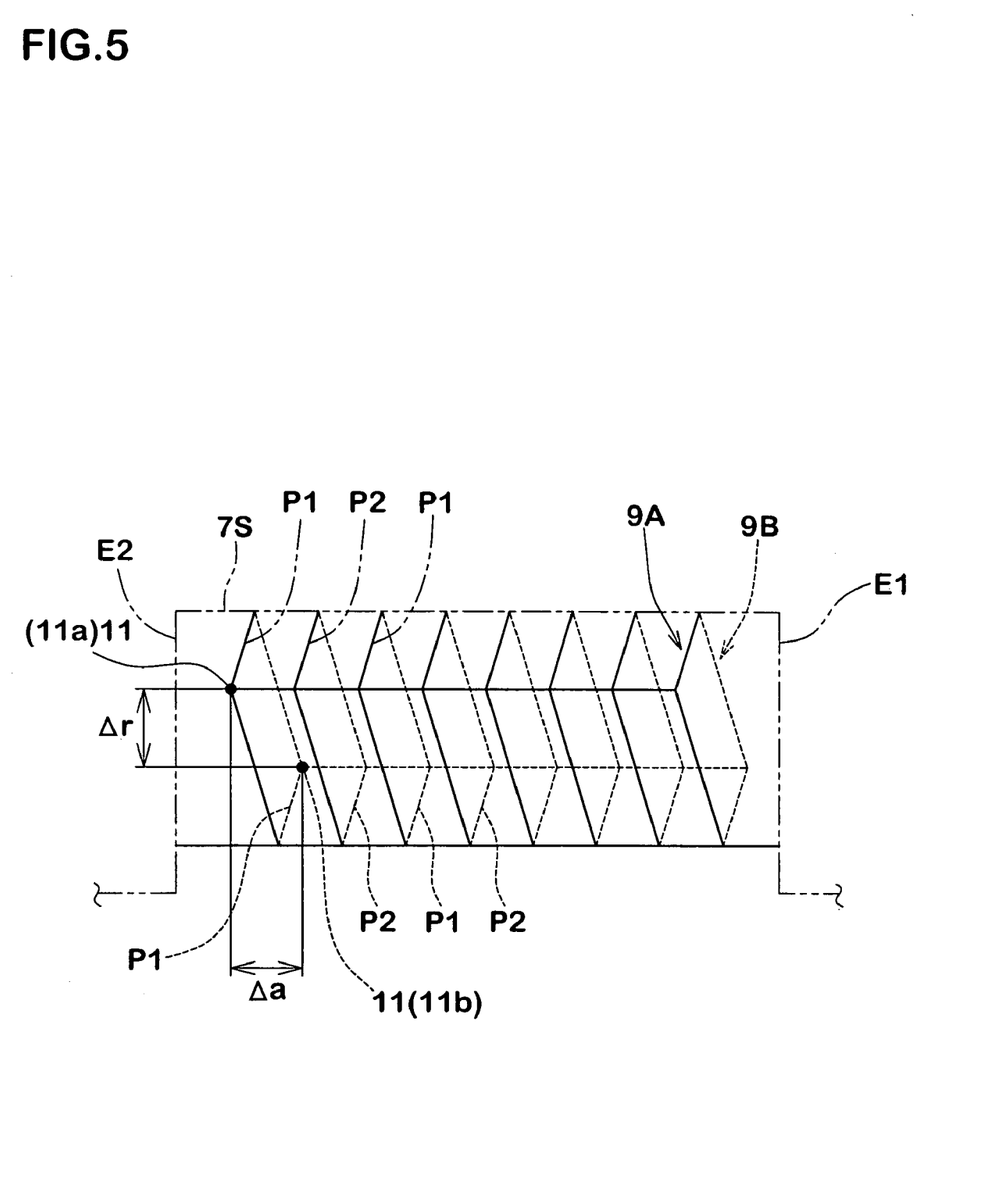
FIG. 5 is a projected view in which the first sipes and second sipes are projected on a plane.

FIG. 5 is a projected view in which the first sipes 9A and second sipes 9B are projected on the same plane, wherein the solid line indicates the first sipes 9A and the broken line the second sipes 9B. While the projecting plane employed here is a plane that is parallel to the straight linear portion 9b of the sipes 9, it may also be a vertical plane that extends along the tire axial direction. When performing projecting, one of the ends of the zigzag parts 9a are aligned while using the same as a reference. The turn-back points of displacement 11a of the first sipes 9A and the turn-back points of displacement 11b of the second sipes 9B have a deviation of $\Delta r$ ($\neq 0$) in the depth direction and of $\Delta a$ ($\neq 0$) in the length direction. This deviation is provided by mutually reversing the directions of displacement and by mutually changing the depth positions of the turn-back points of displacement 11a, 11b for the first sipes 9A and the second sipes 9B.

Blocks 7 including such sipes 9 are arranged in that opposing sipe surfaces 9S, 9S are formed as three-dimensional curved surfaces with three-dimensional concaves and convexes. Accordingly, since the convex parts and the concave parts of the sipe surfaces 9S, 9S mesh with each other, it is possible to prevent large positional shifts in the length direction and the depth direction of the sipes. The rigidity of the block is thus highly secured, and large collapsing of blocks at the time of driving or braking can be effectively restricted. It is accordingly possible to firstly restrict degradations in adhesive frictional force accompanying the decrease in grounding area of the blocks. Secondary, edges of the sipes 9 can be effectively adhered to improve road surface scratching force (edge effects) to thereby improve the on-ice performance to a further extent.

The above-described functions of maintaining the block rigidity are most effectively exhibited proximate of the turn-back points of displacement 11a, 11b. Accordingly, by including first and second sipes 9A, 9B with different positions of turn-back points of displacement 11 within a single block 7, it will be possible to maintain the block rigidity high also against various kinds of external forces.

Figure 6A:
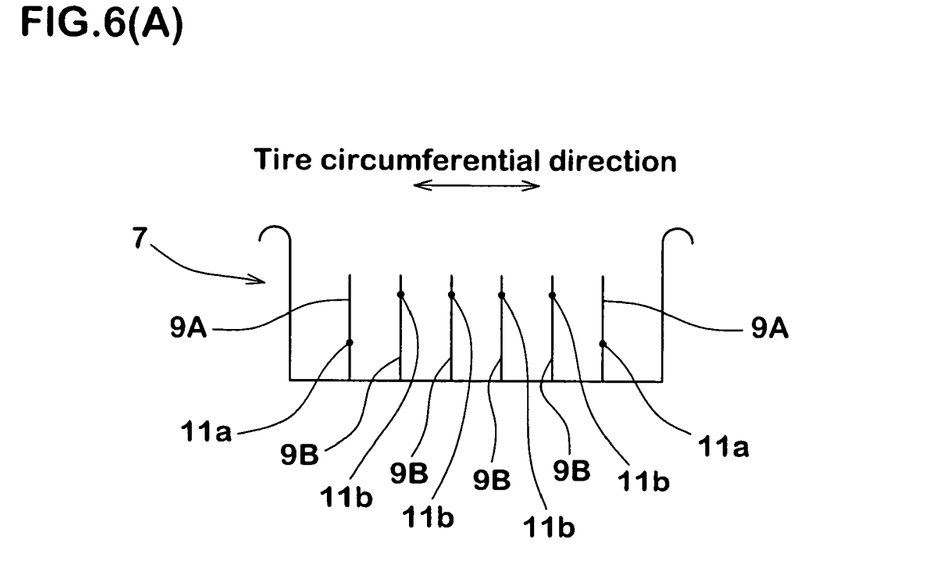
FIG. 6(A) is a side view of a block.
Figure 6B:
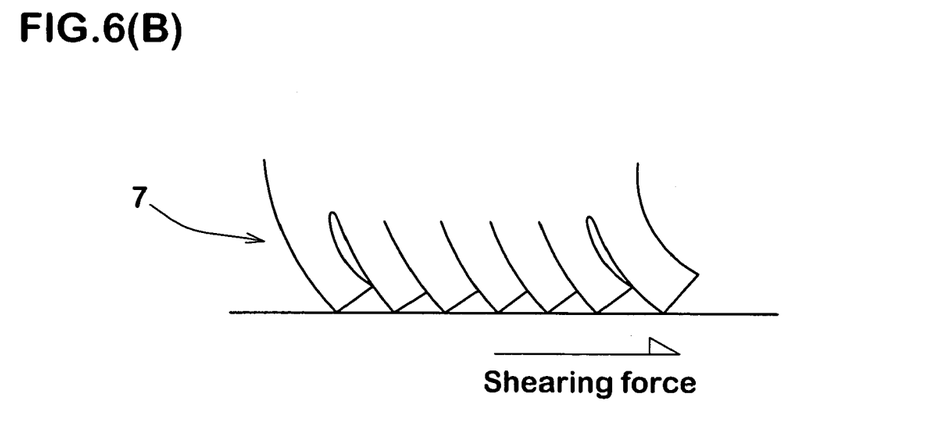
FIGS. 6(B) and 6(C) are side views of the blocks during running.

In one exemplary embodiment, first sipes 9A having a small depth d of the turn-back points of displacement 11 (in case a plurality of turn-back points of displacement 11 are provided, the depth d of the turn-back point of displacement 11 that is closest to the block surface) are disposed on both ends sides of the block 7 in the tire circumferential direction as illustrated in FIG. 6(A). At the intermediate portion of the block 7 in the tire circumferential direction, the second sipes 9B of large depth d of the turn-back points of displacement 11 are disposed.

Figure 6C:
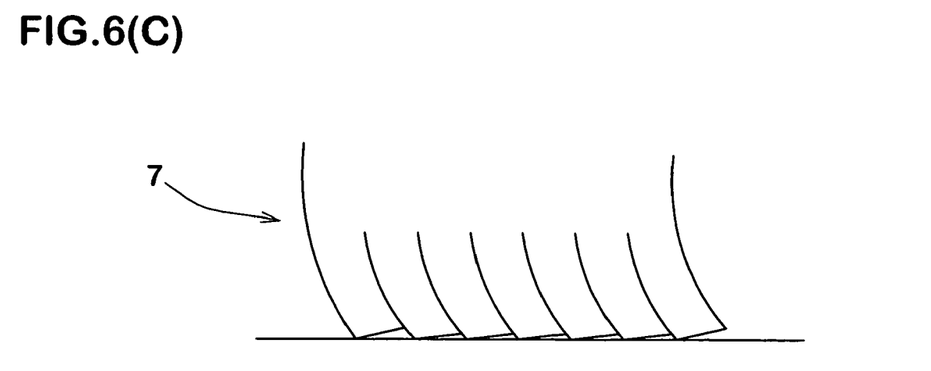

As illustrated in FIG. 6(B), a large shearing force usually acts on each end portion of the block 7 in the tire circumferential direction at the time of entry to and at the time of kick-out from the road surface. Accordingly, the slip amount thereof is relatively large when compared to the intermediate portion. So-called heel and toe wear in which only each end portion of the block 7 wear out at an early stage are thus apt to occur. On the other hand, when shearing force acts on the block surface 7S, the first sipes 9A with the small depth d of the turn-back points of displacement 11 can hold down the amount of positional shift of the sipe surfaces 9S, 9S to be smaller when compared to the second sipes 9B. Accordingly, the apparent rigidity can be made relatively larger at each end portion of the block 7 in the tire circumferential direction when compared to that of the intermediate portion. It is therefore possible to reduce the amount of slip with respect to road surfaces of each end portion of the block 7 to thus prevent the impartial wear as illustrated in FIG. 6(C). By appropriately making each end portion of the block 7 in the tire circumferential direction contact the road surface, it is possible to exhibit effective edge effects also in view of braking force and driving force.

By differing positions of turn-back points of displacement 11 in the depth direction and/or the length direction within a single block 7, it is possible to effectively restrict opening of the sipe surfaces with respect to external force acting thereon. In this respect, it is also possible to include other sipes 9 including no turn-back points of displacement 11 at the intermediate portion of the block 7 in the circumferential direction as one modified example of the present embodiment. However, it is preferable that all sipes 9 that are disposed in a single block include turn-back points of displacement 11.

Each end portion of the block 7 in the tire circumferential direction faces the lateral main grooves 4. While block pieces that are partitioned between the sipes will relatively easily escape to the lateral main groove side when drawing the knife blades out from the sipes 9 at the time of removal from the mold after vulcanization molding, the block pieces have little space to escape to when located at the intermediate portion of the block 7. There exists the possibility that damages such as chipping of rubber occur at the intermediate portion of the block when drawing the knife blades out. For effectively preventing such chipping of rubber, it is possible to preferably employ an arrangement in which the first sipes 9A of large amount of displacement $\delta a1$ in the length direction (corresponding to the amplitude when the ridge lines are considered as waveforms) are disposed at each end portion of the block 7 in the tire circumferential direction while the second sipes 9B of small amount of displacement $\delta a2$ in the length direction are provided at the intermediate portion of the block 7.

When both of the deviations $\Delta r$, $\Delta a$ of the turn-back points of displacement 11a, 11b are too small in a single block 7, the effects caused through the differing of the positions of the turn-back points of displacement 11, that is, the effects of restricting collapsing of the blocks with respect to various kinds of external force are apt to be degraded. On the other hand, when they are too large, chipping of rubber or similar is apt to occur at the sipe surfaces when drawing the knife blades out from the sipes. In view of those points, it is preferable to set the deviation $\Delta r$ in the depth direction to 5 to 95% of the depth ds of the sipes 9, and further to 30 to 70%, though not particularly limited. The deviation $\Delta a$ of the sipes 9 in the length direction is preferably set to 1 to 15 mm, and further to 3 to 10 mm.

Figure 8:
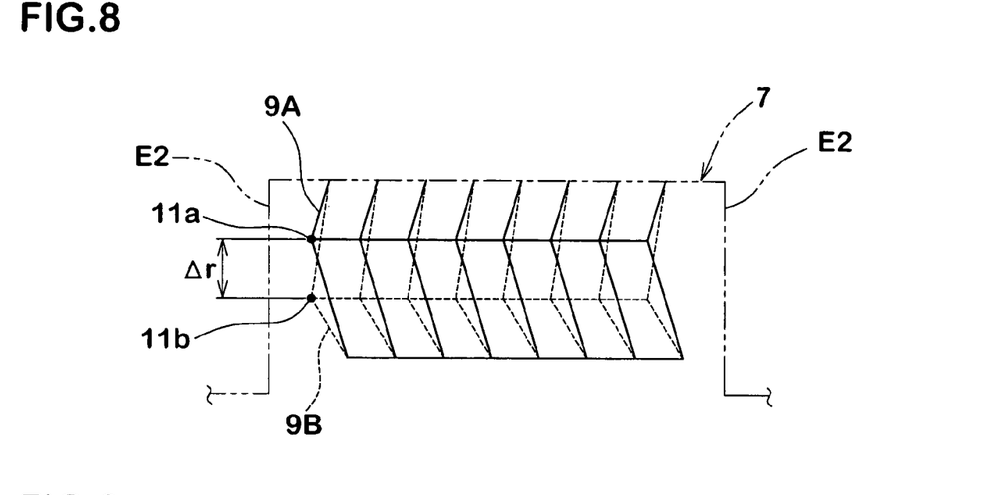
FIG. 8 is a projected view of sipes representing another embodiment of the present invention.

FIG. 8 illustrates another embodiment of the present invention.

The above embodiment has illustrated a case in which positions of turn-back points of displacement 11a, 11b in the length direction and the depth direction were different in the first and second sipes 9A, 9B. FIG. 8 illustrates a case in which only the positions of the sipes in the depth direction differ by deviation $\Delta r$ for the first and second sipes 9A, 9B while positions in the length direction of the sipes are substantially identical. The present embodiment further illustrates a case in which the first sipes 9A and the second sipes 9B displace towards the same direction in the length direction of the sipes from the block surface 7S (particularly to the other end E2 side) to reach the turn-back points of displacement 11a, 11b.

Figure 9:
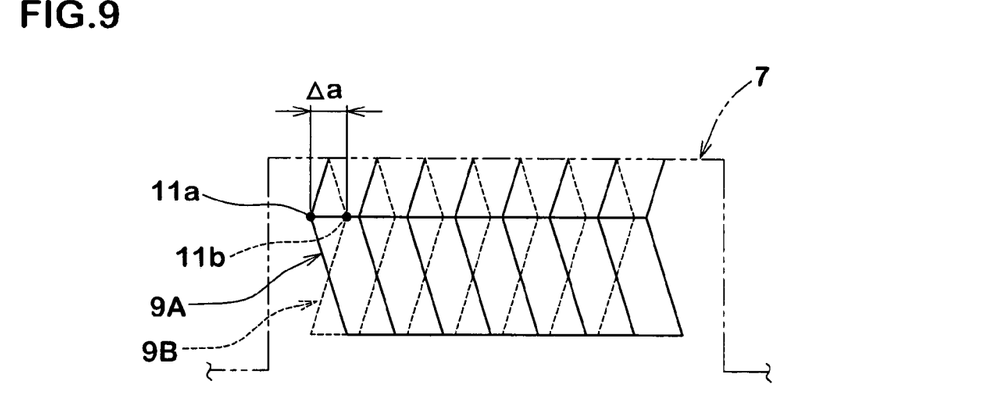
FIG. 9 is a projected view of sipes representing another embodiment of the present invention.

FIG. 9 illustrates another embodiment of the present invention.

In the present embodiment, the first and second sipes 9A, 9B are arranged in that the turn-back points of displacement 11a, 11b include deviations Δa only in the length direction of the sipes while positions in the depth direction of the sipes are substantially identical. Moreover, the first sipes 9A and the second sipes 9B of the present embodiment are illustrated such that their directions of displacement are reversed from the block surface 7S to the turn-back points of displacement 11. Such an embodiment is particularly preferable since the rigidity holding functions of the blocks will be more effectively exhibited with respect to external force from all directions.

Figure 10:
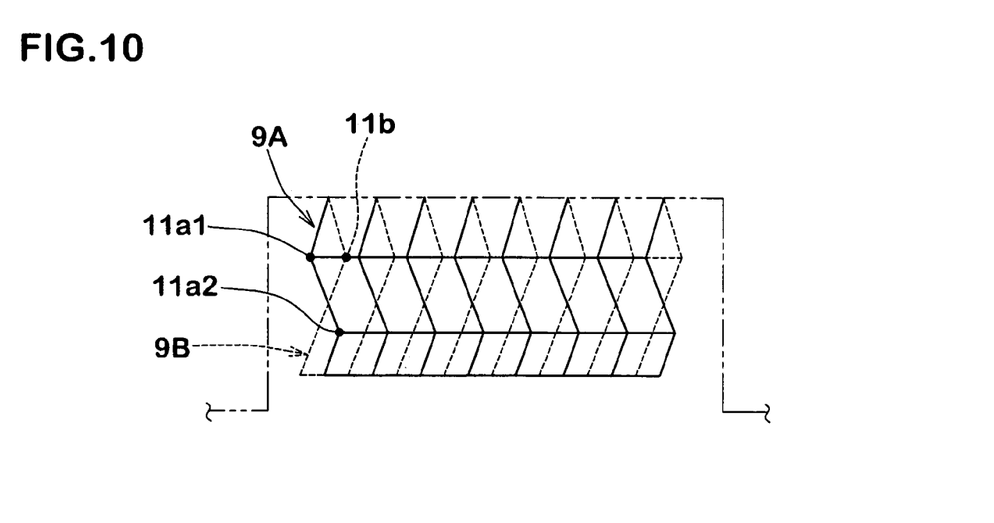
FIG. 10 is a projected view of sipes representing another embodiment of the present invention.

FIG. 10 illustrates still another embodiment of the present invention.

In the above embodiments, the first and second sipes 9A, 9B respectively included the same number of turn-back points of displacement 11. In contrast thereto, the numbers of turn-back points of displacement 11 of the first sipes 9A and the second sipes 9B differ from each other. More particularly, the first sipes 9A include two turn-back points of displacement 11a1, 11a2 while the second sipes 9B include one turn-back point of displacement 11b.

Figure 11:
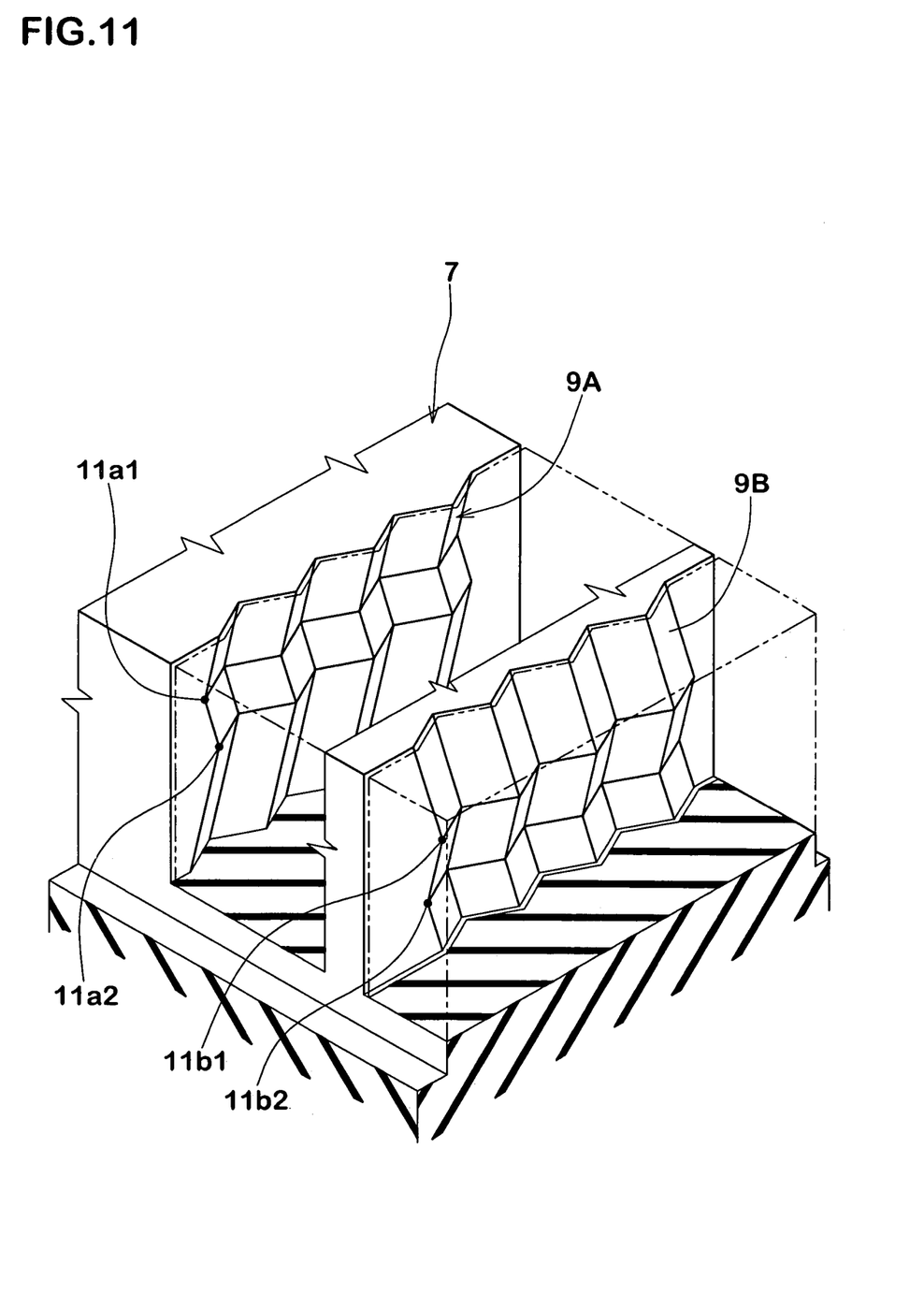
FIG. 11 is a perspective view of a block representing another embodiment of the present invention.

An increase in the number of turn-back points of displacement 11 will result in a further improvement in the rigidity holding function of the block. For this purpose, it is therefore preferable that both of the first and second sipes 9A, 9B includes two or more turn-back points of displacement 11 as illustrated in FIG. 11 and that these are further shifted in position.

While the embodiments have illustrated a case in which first and second sipes 9A, 9B of different positions of turn-back points of displacement 11 were employed, it is possible to form the sipes 9A, 9B by using completely different knife blades in such a case. However, by employing identical knife blades upon reversing them upside down as illustrated in FIGS. 2 and 11, it is possible to form two kinds of sipes of different turn-back points of displacement 11. In such a case, it is possible to improve the workability of the knife blades and thus to improve the productivity. The blocks 7 may also include three or more types of sipes 9 including turn-back points of displacement 11 and which positions differ from each other.

EXAMPLE

Figure 12A:
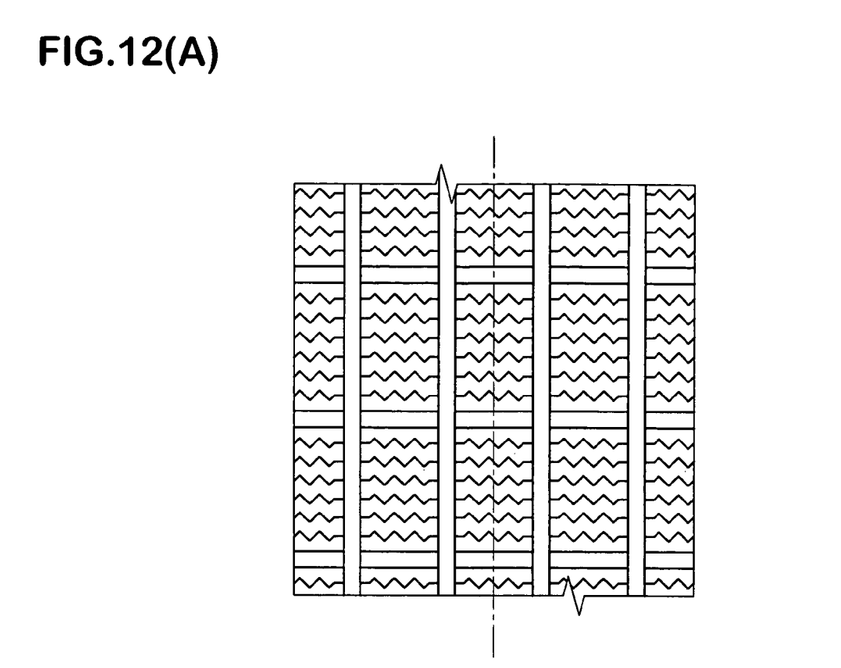
FIG. 12(A) is a view illustrating a tread pattern of an example.
Figure 12B:
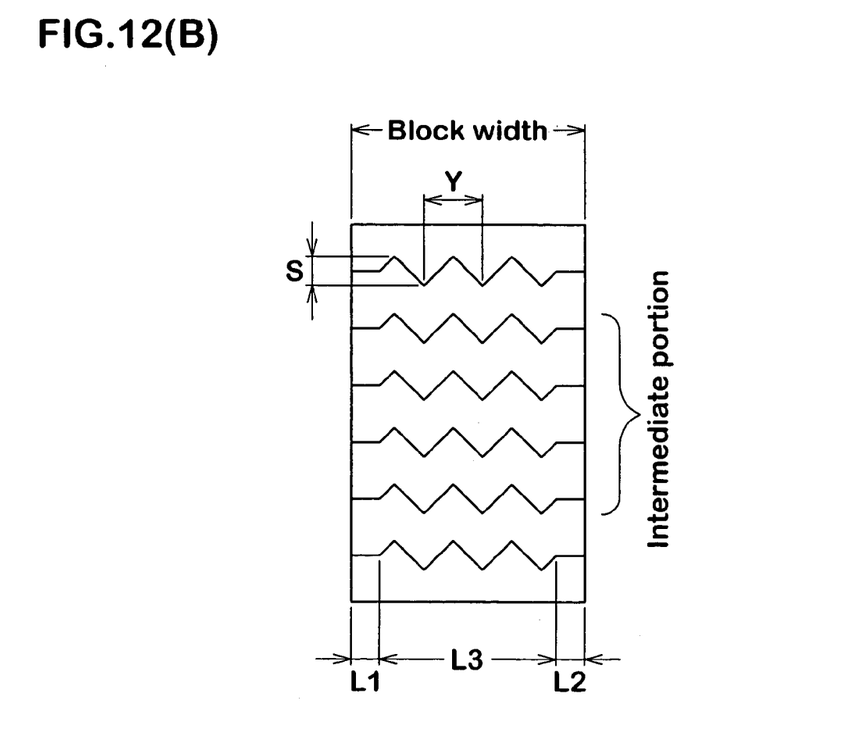
FIG. 12(B) is an enlarged plan view of the block.

Studless tire (tire size 195/65R15) for an automobile having a tread pattern as illustrated in FIG. 12(A) were manufactured on trial according to the specifications of Table 1 on the basis of the sipes of FIG. 2. The steering stability of each sample tire was tested on an icy road surface and on a dry pavement surface. In this respect, for purpose of comparison, test were also performed with tires in which none of the sipes within the blocks were displaced at all in the length direction at the positions in the depth direction (Comparative Example 1) and those in which displacements are present but turn-back points of displacement were provided at identical positions (Comparative Example 2). Chipping of rubber after vulcanization arising from the sipes were confirmed through visual checks. ◉ were best while ○ were also acceptable. The test results are shown in Table 1.

(1) Steering Stability

Each sample tire was attached to all wheels of an automobile (2,000 cc displacement, FR vehicle) with a rim of 15×6JJ and an internal pressure of 200 kPa, and the automobile ran on an icy road and on a dry pavement. Properties related to steering wheel response, sense of rigidity, and grip force at the time of braking and driving were evaluated through sensory evaluation of the driver using indices with the index of the prior art being 100. The larger the numeric values, the better the performance.

TABLE 1

Figure 7:
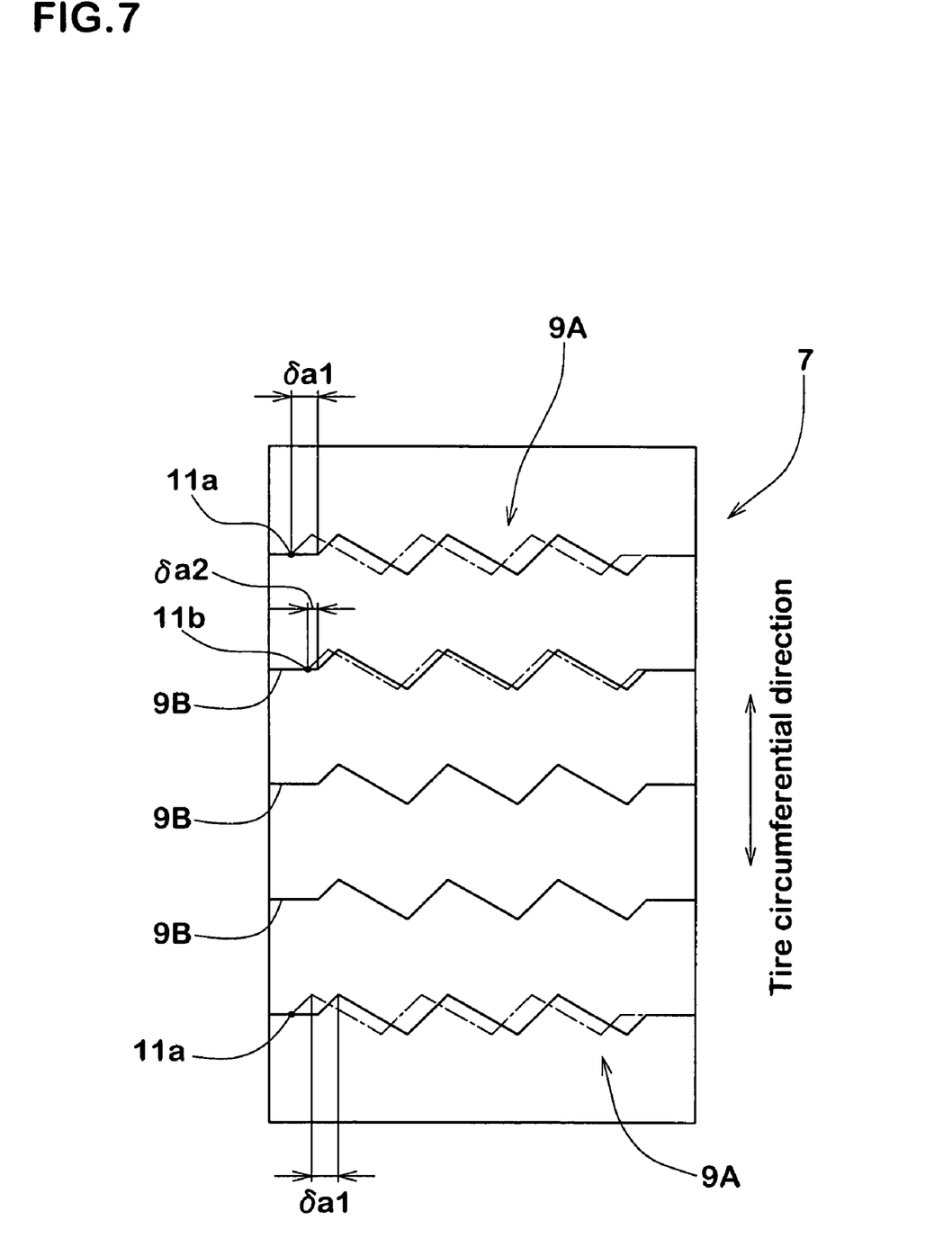
FIG. 7 is a plan view of a block.

| | | Comparative Example 1 | Comparative Example 2 | Example 1 | Example 2 | Example 3 | Example 4 | Example 5 | Example 6 |
|---|---|---|---|---|---|---|---|---|---|
| Block height [mm] | | | | | 10.0 (Constant) | | | | |
| Block width [mm] | | | | | 20.0 (Constant) | | | | |
| Drawing illustrating configuration of sipes | | — | — | FIG. 5 | FIG. 7 | FIG. 8 | FIG. 9 | FIG. 10 | FIG. 5 |
| Depth of sipes [mm] | | | | | 9.0 (Constant) | | | | |
| First sipes | Length L1, L2 of straight linear portions [mm] | 2.0 | 2.0 | 2.0 | 2.0 | 2.0 | 2.0 | 2.0 | 2.0 |
| | Length L3 of zigzag part [mm] | 16.0 | 16.0 | 16.0 | 16.0 | 16.0 | 16.0 | 16.0 | 16.0 |
| | Amplitude S of zigzag part [mm] | 1.5 | 1.5 | 1.5 | 1.5 | 1.5 | 1.5 | 1.5 | 1.5 |
| | Pitch Y of zigzag part [mm] | 4.0 | 4.0 | 4.0 | 4.0 | 4.0 | 4.0 | 4.0 | 4.0 |
| | Depth d of turn-back point of displacement [mm] | — | 3.0 | 3.0 | 3.0 | 3.0 | 3.0 | 3.0 (Two spots) | 6.0 |
| | Amount of displacement δ in the length direction [mm] | — | 1.4 | 1.4 | 2.2 | 1.4 | 1.4 | 1.4 | 1.4 |
| | Position disposed on the block | Entirely | Entirely | Both ends in the circumferential direction | Both ends in the circumferential direction | Both ends in the circumferential direction | Both ends in the circumferential direction | Both ends in the circumferential direction | Intermediate portion in the circumferential direction |
| Second sipes | Length L1, L2 of straight linear portions [mm] | — | — | 2.0 | 2.0 | 2.0 | 2.0 | 2.0 | 2.0 |
| | Length L3 of zigzag part [mm] | — | — | 16.0 | 16.0 | 16.0 | 16.0 | 16.0 | 16.0 |

TABLE 1-continued

|  | Comparative Example 1 | Comparative Example 2 | Example 1 | Example 2 | Example 3 | Example 4 | Example 5 | Example 6 |
|---|---|---|---|---|---|---|---|---|
| Amplitude S of zigzag part [mm] | — | — | 1.5 | 1.5 | 1.5 | 1.5 | 1.5 | 1.5 |
| Pitch Y of zigzag part [mm] | — | — | 4.0 | 4.0 | 4.0 | 4.0 | 4.0 | 4.0 |
| Depth d of turn-back point of displacement [mm] | — | — | 6.0 | 3.0 | 6.0 | 3.0 | 3.0 (One spot) | 3.0 |
| Amount of displacement δ in the length direction [mm] | — | — | 1.4 | 1.4 | 1.4 | 1.4 | 1.4 | 1.4 |
| Position disposed on the block | — | — | Intermediate in the circumferential direction | Intermediate in the circumferential direction | Intermediate in the circumferential direction | Intermediate in the circumferential direction | Intermediate in the circumferential direction | Both ends in the circumferential direction |
| Deviation Δa of turn-back point of displacement [mm] | — | — | 2.8 | 3.6 | — | 2.8 | 2.8 | 2.8 |
| Deviation Δr of turn-back point of displacement [mm] | — | — | 3.0 | 3.0 | 3.0 | — | — | 3.0 |
| Steering stability on icy road | 100 | 110 | 115 | 118 | 113 | 117 | 120 | 110 |
| Steering stability on dry road | 100 | 108 | 113 | 120 | 110 | 115 | 120 | 112 |
| Chipping of rubber of sipes after molding | ⊚ | ○ | ○ | ○ | ○ | ○ | ○ | ○ |

What is claimed is:

1. A pneumatic tire comprising a tread portion, the tread portion having blocks provided with sipes, the sipes having an open top end that opens to a block surface and a bottom, and a configuration of the sipes in a plane parallel with the block surface comprising a zigzag part, wherein the zigzag part displaces upon turning back to one side and to the other side in a length direction of the sipes in the course from the open top end to the bottom, wherein a first sipe and a second sipe, in which positions of the turn-back points of displacement in the length direction differ from each other, are included in at least one of the blocks; and wherein the blocks are arranged in that sipes of a large amount of displacement of the turn-back points of displacement in the length direction are disposed on both end sides in the tire circumferential direction while sipes of a small amount of displacement of the turn-back points of displacement in the length direction are disposed on a central side of the tire circumferential direction.

2. The pneumatic tire as claimed in claim 1, wherein the first sipe and the second sipe are arranged in that their depths of the turn-back points of displacement differ from each other.

3. The pneumatic tire as claimed in claim 2, wherein a difference Δr of the depth of the turn-back point of displacement of the first sipe and the depth of the turn-back point of displacement of the second sipe is 5 to 95% of a sipe depth ds from the open top end to the bottom of the sipes.

4. The pneumatic tire as claimed in claim 2 or 3, wherein the blocks are arranged in that sipes of small depths of the turn-back points of displacement are disposed on both end sides in a circumferential direction of the tire while sipes of large depths of the turn-back points of displacement are disposed on a central side of the fire circumferential direction.

5. The pneumatic tire as claimed in claim 1 or 2, wherein a difference Δa of the depth of the turn-back point of displacement of the first sipe and the depth of the turn-back point of displacement of the second sipe in the length direction is 1 to 15 mm.

* * * * *